(12) United States Patent
Kojima

(10) Patent No.: US 9,003,083 B2
(45) Date of Patent: Apr. 7, 2015

(54) BUFFER CIRCUIT AND SEMICONDUCTOR INTEGRATED CIRCUIT

(71) Applicant: Fujitsu Semiconductor Limited, Yokohama-shi, Kanagawa (JP)

(72) Inventor: Ryuji Kojima, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 14/222,367

(22) Filed: Mar. 21, 2014

(65) Prior Publication Data

US 2014/0297906 A1    Oct. 2, 2014

(30) Foreign Application Priority Data

Mar. 28, 2013 (JP) .................................. 2013-070336

(51) Int. Cl.
*G06F 3/00* (2006.01)
*G06F 5/00* (2006.01)
*G06F 3/06* (2006.01)

(52) U.S. Cl.
CPC ............ *G06F 3/0656* (2013.01); *G06F 3/0604* (2013.01); *G06F 3/0671* (2013.01)

(58) Field of Classification Search
USPC .......................................................... 710/52
See application file for complete search history.

(56) References Cited

U.S. PATENT DOCUMENTS

| 5,596,726 A | 1/1997 | Thielen |
| 2008/0043652 A1 | 2/2008 | Otonari et al. |
| 2012/0131240 A1 | 5/2012 | Aronovich et al. |

FOREIGN PATENT DOCUMENTS

| JP | 07-058780 A | 3/1995 |
| JP | 2008-048326 A | 2/2008 |
| JP | 2012-113705 A | 6/2012 |

*Primary Examiner* — Farley Abad
(74) *Attorney, Agent, or Firm* — Arent Fox LLP

(57) ABSTRACT

A buffer circuit includes: a register array including registers in a plurality of stages; and a control circuit configured to rearrange a plurality of pieces of received data in the register in a determined transfer order and to control the register array to sequentially output the plurality of pieces of received data as one piece of transfer data when all the received data is stored, wherein the control circuit controls the register array to store stored data in each register in a preceding stage when the register array outputs the received data, and the control circuit determines a write register in accordance with the transfer order when the register array newly stores the received data and controls the register array to store data stored in the write register in a following stage of the write register and to store the new received data in the write register.

10 Claims, 11 Drawing Sheets

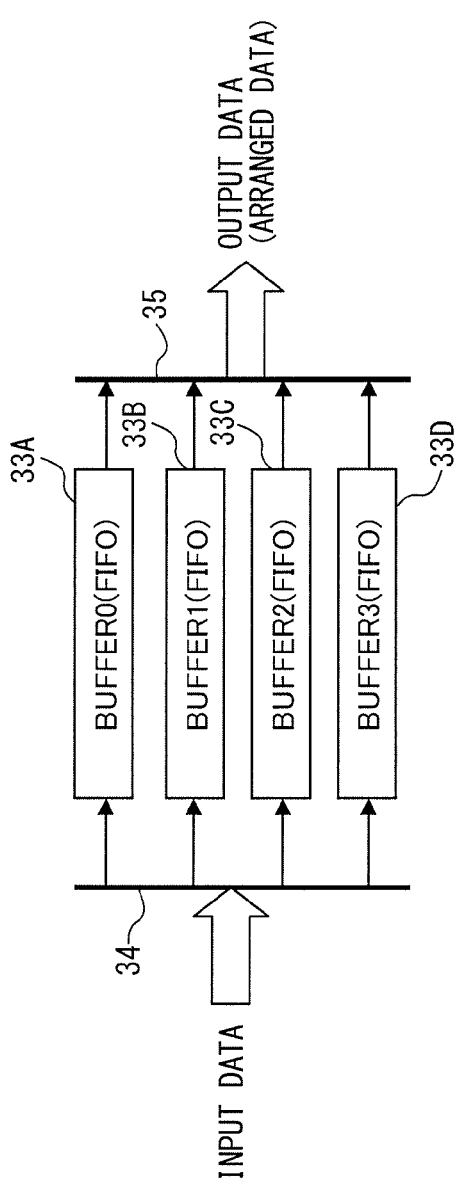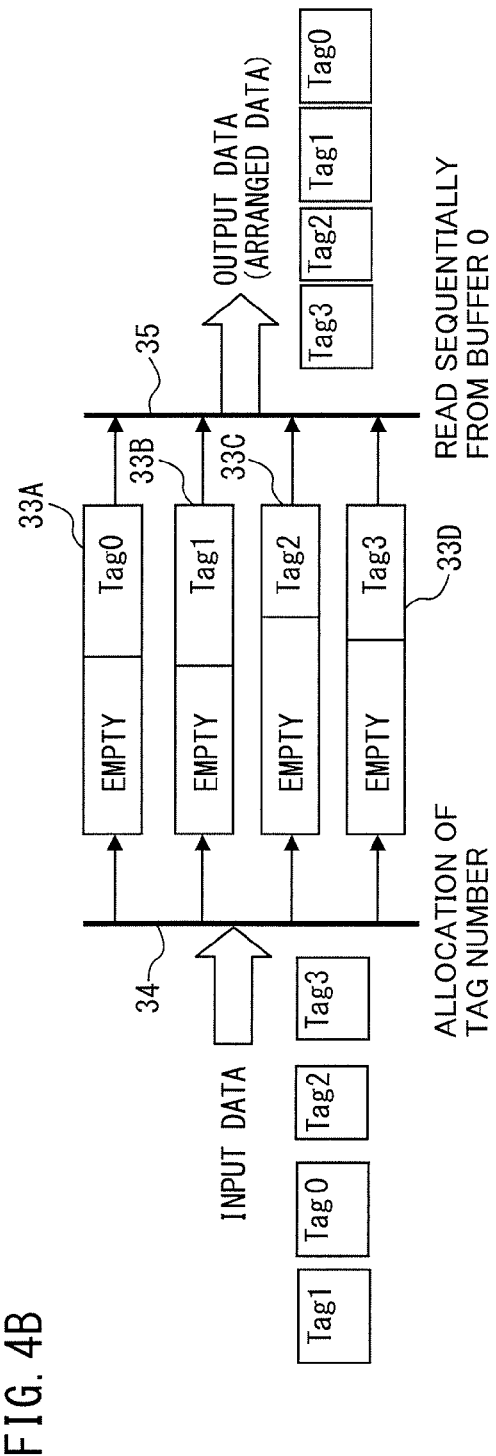

|  | S1 | S2 | SELECTION |
|---|---|---|---|
| OE | 0 | 0 | FOLLOWING STAGE OUTPUT |
| NW | 0 | 1 | INPUT DATA BUS |
| BS | 1 | 0 | PRECEDING STAGE OUTPUT |

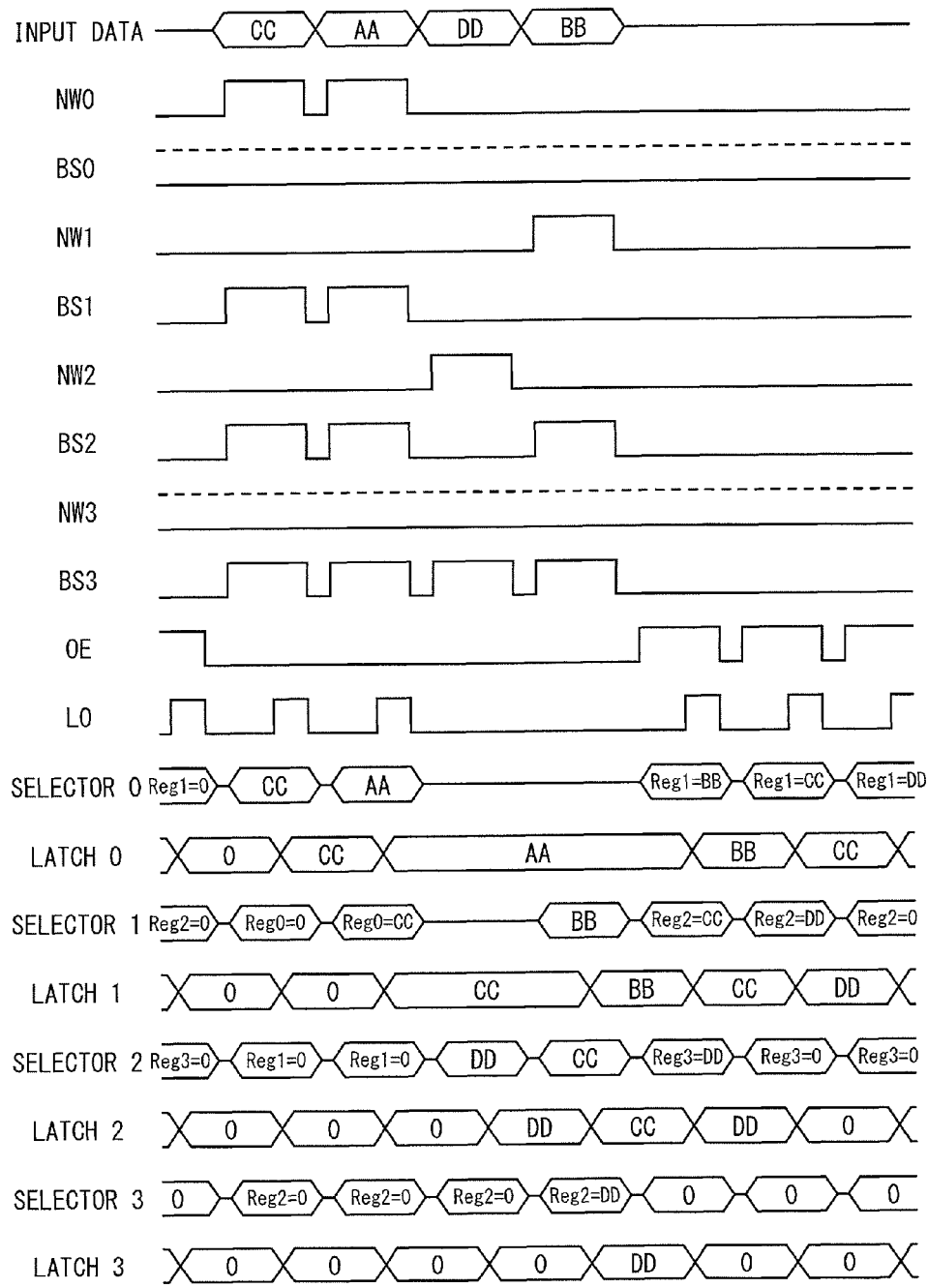

BUFFER CIRCUIT AND SEMICONDUCTOR INTEGRATED CIRCUIT

CROSS-REFERENCE TO RELATED APPLICATION

This application is based upon and claims the benefit of priority of the prior Japanese Patent Application No. 2013-070336, filed on Mar. 28, 2013, the entire contents of which are incorporated herein by reference.

FIELD

The technique disclosed herein relates to a buffer circuit and a semiconductor integrated circuit.

BACKGROUND

When a peripheral device with a bus protocol different from the bus protocol of an internal local bus is connected, a protocol conversion circuit is provided and communication is established between the different protocols. When data of a low-speed peripheral device is read from a high-speed local bus, because the protocols are different, the peripheral device divides transfer data and transfers the divided data, however, outputs the divided data to the local bus as one piece of transfer data. Moreover, there is a case where the divided data is transferred in random order, and therefore, the divided data is rearranged.

A general buffer circuit that rearranges transfer data as described above has a capacity large in size compared to the maximum total amount of transfer data and the capacity is not used effectively.

Further, when rearrangement is implemented, latency in the output to the local bus becomes high.

RELATED DOCUMENTS

[Patent Document 1] Japanese Laid Open Patent Document No. H07-58780

SUMMARY

According to a first aspect, a buffer circuit includes: a register array including a plurality of registers in a plurality of stages; and a control circuit configured to rearrange a plurality of pieces of received data in a determined transfer order and to store the rearranged received data in the register array, the control circuit configured to control the register array so that the register array sequentially outputs the plurality of pieces of received data as one piece of transfer data when all the received data is stored, wherein the control circuit controls the register array so that the register array stores a piece of data stored in each register in a register in a preceding stage when the register array outputs the plurality of pieces of received data, and the control circuit determines a write register among the plurality of registers in accordance with the transfer order when the register array newly stores a new piece of the received data and controls the register array so that the register array stores a piece of data stored in the write register in a register in a following stage of the write register and stores the new piece of received data in the write register.

According to a second aspect, a semiconductor integrated circuit includes: a local bus; and an interface circuit configured to interface with a peripheral device and connected to the local bus, wherein the interface circuit includes a buffer circuit, the buffer circuit including: a register array including a plurality of registers in a plurality of stages; and a control circuit configured to rearrange a plurality of pieces of received data in a determined transfer order and to store the rearranged received data in the register array, the control circuit configured to control the register array so that the register array sequentially outputs the plurality of pieces of received data as one piece of transfer data when all the received data is stored, wherein the control circuit controls the register array so that the register array stores a piece of data stored in each register in a register in a preceding stage when the register array outputs the plurality of pieces of received data, and the control circuit determines a write register among the plurality of registers in accordance with the transfer order when the register array newly stores a new piece of the received data and controls the register array so that the register array stores a piece of data stored in the write register in a register in a following stage of the write register and stores the new piece of received data in the write register.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF THE DRAWINGS

FIG. 4A is a diagram illustrating an example of configuration of a buffer circuit configured to buffer and arrange data input in random order;

FIG. 4B is a diagram illustrating an example of a state where data of each data buffer is stored in the buffer circuit in FIG. 4A;

FIG. 12 is a time chart corresponding to FIGS. 9A to 11C.

DESCRIPTION OF EMBODIMENTS

Before explaining an embodiment, a general buffer circuit configured to store a plurality of pieces of received data input in random order after rearranging the data in a predetermined transfer order so as to sequentially output the data as one piece of transfer data is explained.

In a system mounted on an LSI (large scale semiconductor integrated circuit) etc., there is a case where a protocol conversion circuit is provided and a peripheral device with a bus protocol different from the bus protocol of the internal local bus is connected.

Figure 1:
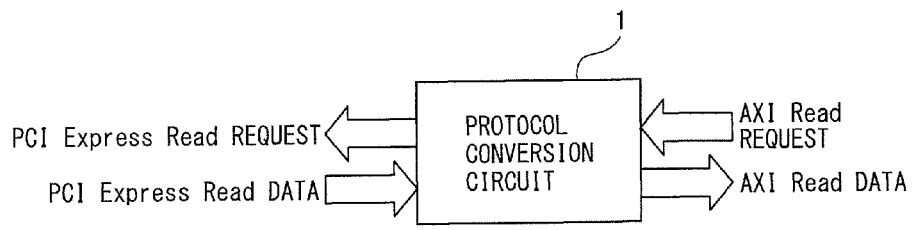
FIG. 1 is a diagram illustrating an example of a protocol conversion circuit.

FIG. 1 is a diagram illustrating an example of a protocol conversion circuit.

A protocol conversion circuit 1 in FIG. 1 carries out conversion between the AXI local bus protocol of the inside on the system side and the PCI Express protocol of a peripheral device. For example, the protocol conversion circuit 1 performs the operation to convert a read request (data request having a size) from the system side AXI (Advanced eXtensible Interface) local bus into a read request of PCI Express. However, due to limitation on the upper limit value of the request size and restrictions peculiar to the bus, the one-time AXI read request is divided into a plurality of PCI Express read requests. Further, for the PCI Express bus for which division of the request is required, it is not regulated to return the read data in the order of requests, and therefore, the divided data is transferred in random order. However, one piece of data is returned in the order as the AXI read data, and therefore, the divided data is rearranged.

The example of conversion between the AXI local bus and PCI Express is illustrated, however, this is a mere example and various kinds of bus protocol conversion are carried out. Hereinafter, explanation is given with PCI Express as an example.

In a large scale system mounted on an LSI etc., in general, various kinds of interface modules, such as PCI Express, USB (Universal Serial Bus), SATA (Serial Advanced Technology Attachment), and Ethernet (registered trademark), are connected to a local bus and communication is established with peripheral devices of different kinds.

Figure 2:
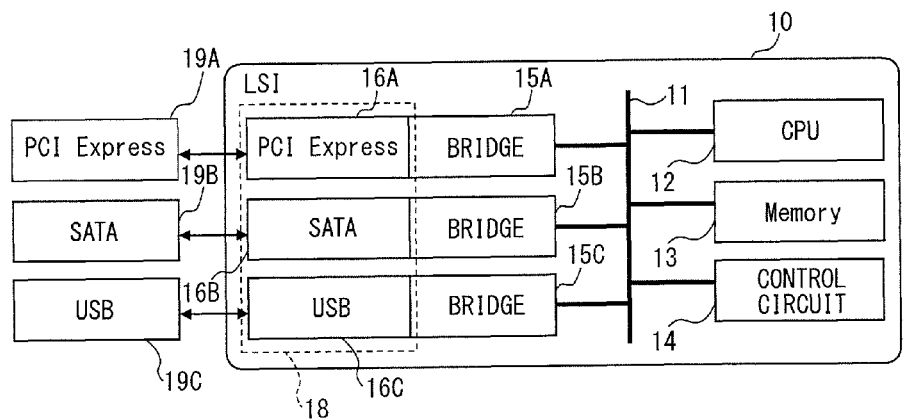
FIG. 2 is a diagram illustrating a configuration of an LSI system in which an interface module for performing communication with peripheral devices having a plurality of different interfaces is connected to a local bus.

FIG. 2 is a diagram illustrating a configuration of an LSI system in which an interface module for performing communication with peripheral devices having a plurality of different interfaces is connected to a local bus.

A system 10 has a local bus 11, a CPU 12, a memory 13, a control circuit 14, etc., connected to the local bus 11. The local bus 11 is further connected to an interface module 18 via bridge circuits 15A to 15C. The interface module 18 is a circuit having a plurality of circuits, such as protocol conversion circuits 16A to 16C illustrated in FIG. 1, in accordance with bus protocols of peripheral devices 19A to 19C.

As described above, because the specifications of the buses are different, consistency of the data needs to be achieved in order to connect the local bus and the interface module. Because of this, the bridge circuits 15A to 15C are prepared so as to enable connection to the local bus of each peripheral device.

Figure 3:
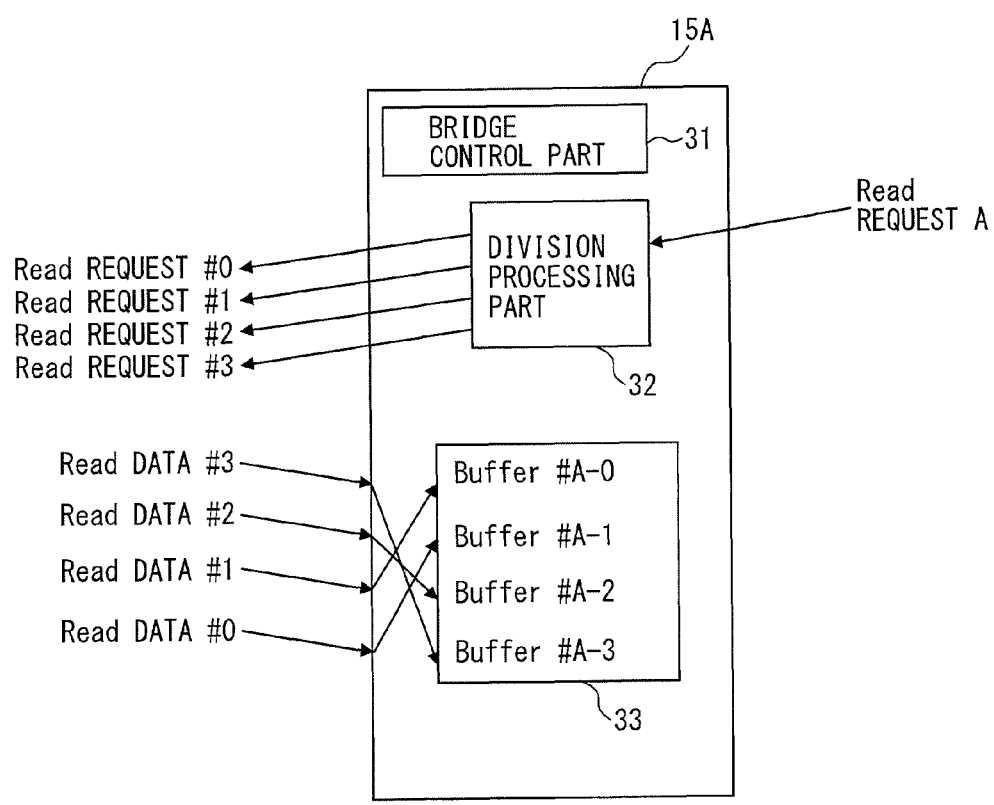
FIG. 3 is a diagram explaining the bridge circuit between an AXI local bus and a PCI Express interface module.

FIG. 3 is a diagram explaining the bridge circuit 15A between the AXI local bus 11 and the PCI Express interface module 16A.

The bridge circuit 15A has a bridge control part 31, a division processing part 32, and a buffer circuit 33. In the read data transfer, the bridge circuit 15A issues a read request to a peripheral device in response to the issuance of a read request A and receives read data from the peripheral device in response thereto and outputs it to the local bus. The bridge control part 31 controls each part.

For example, in the case where a read request of 256 bytes is made at one time to the PCI Express interface module 16A through the local bus 11, there is a case where it is required to divide the request into two read requests of 128 bytes in the transfer request to the PCI Express peripheral device 19A.

In the read transfer divided twice or more times, the order of transfer is not regulated and there occurs a case where a response is made in random order due to the read timing in the device. In this case, a tag is attached to each piece of divided data to be transferred so that the order of the divided data is known.

On the other hand, the transfer data output from the PCI Express interface module 16A and the bridge circuit 15A to the local bus 11 is returned as one-time data for the original 256-byte request. Because of this, control to arrange data into the correct order is required in the bridge circuit 15A.

As illustrated in FIG. 3, in the read data transfer, the bridge circuit 15A causes the division processing part 32 to issue a plurality of read requests #0 to #3 for peripheral devices in response to the issuance of the read request A. In response to this, the peripheral devices output read data #0 to #3 to the interface module 16A and the bridge circuit 15A and the bridge circuit 15A receives the read data #0 to #3, however, the order of reception is not the order of the read requests. Because of this, in the bridge circuit 15A, the order of the read requests and the order of the read data are made to correspond to each other and the read data is rearranged into the order corresponding to the order of the read requests. The buffer circuit 33 is used for this rearrangement. In FIG. 3, the read data is transferred in the order of #3, #2, #0 and #1 and in the buffer circuit 33, the read data is rearranged into the order of #A-0, #A-1, #A-2, and #A-3 and is output in this order.

It is assumed that the maximum value of the total amount of data (read request A) to be arranged is determined, however, the amount of each piece of divided data (data #0, #1, #2, #3) may be a variable amount depending on circumstances.

For example, in the case where the total amount of data is 128 bytes and the number of divisions is 1, the data will be one piece of 128-byte data and in the case where the number of divisions is 4, data different in amount, such as 14 bytes, 64 bytes, 32 byes, and 18 bytes, will be input and the order of the data is arranged. At this time, a TAG number (#0, #1, #2, . . . ) to identify the order is attached to each piece of divided data and this is used to identify the order of the divided data. Further, it is assumed that the order of the data strings within each piece of the divided data is maintained.

In order to meet the above-mentioned requirements, a mechanism to buffer and rearrange data input in random order is required.

FIG. 4A is a diagram illustrating an example of configuration of a buffer circuit configured to buffer and arrange data input in random order. FIG. 4B is a diagram illustrating an example of a state where data of each data buffer is stored in the buffer circuit in FIG. 4A.

The buffer circuit in FIG. 4A has four, which is the maximum number of divisions in accordance with the TAG number, data buffers 33A to 33D and stores data input via an input bus 34 in each data buffer in accordance with the TAG number. By outputting the data allocated to the plurality of data buffers in the order of the buffer numbers 0, 1, 2 and 3 to an output bus 35, the data is output as arranged data.

The four data buffers 33A to 33D have the size of the maximum total amount of data, and therefore, in the buffer circuit in FIG. 4A, the capacity of the data buffer corresponding to "total amount of data x number of divided stages" is required. For example, in the case where four pieces of 32-byte data are input in random order in the transfer of 128 bytes in total, a buffer of 128 bytes×four stages=512 bytes are prepared and the capacity of the buffer is larger than the transfer amount. Because of this, as illustrated in FIG. 4B, the four data buffers 33A to 33D each have a large empty area even in the state where all the transfer data having the size of the maximum total amount of data is stored, and therefore, the capacity of the data buffer 33A to 33D is not used effectively.

In this control, rearrangement is implemented by storing input data Tag3, Tag2, Tag0, and Tag1 in buffers 3, 2, 0 and 1 in accordance with the Tag number and by reading the data to be output by the amount of stored information each time in the ascending order of the buffer number. In order to implement such control to read from the data buffers, the amount of data stored in each buffer is grasped and the buffer data is switched. Because of this, there is a data processing time or a control delay by a combinational circuit for the control, and therefore, latency in data transfer is caused and the transfer efficiency is impaired.

As described above, in the case where data is stored in the buffer circuit in the order of transfer from the peripheral devices and the data is output to the local bus in view of the order, processing to determine the storage position from which data is output is performed as a result. Because of this, latency is caused in the output to the local bus.

The embodiment is a buffer circuit whose latency in the output to the local bus is required to be small. Because of this, in the buffer circuit of the embodiment, in the transfer order required by the system, in other words, in the order of output to the local bus, the data is stored in the buffer circuit, and thus, the data output control is simplified, thereby the latency is made small and high speed is achieved. Then, the buffer circuit is one in which the size of the buffer is reduced, for example, the size is set to the maximum total amount of data.

Figure 5A:
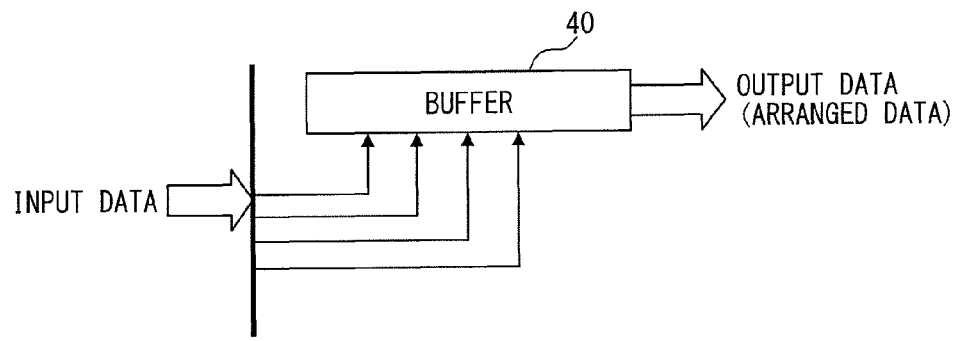
FIGS. 5A to 5C are diagrams explaining the basic operation of the buffer circuit of the embodiment.
Figure 5B:
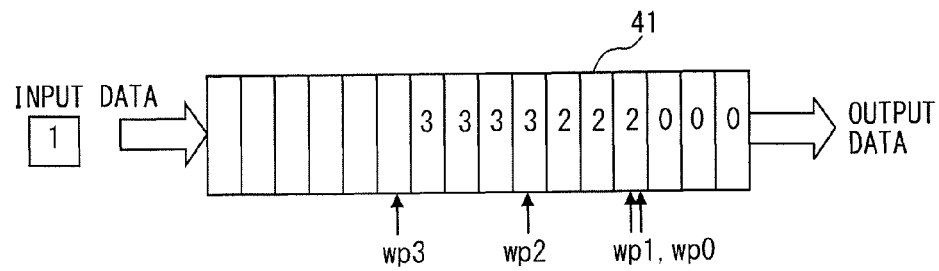
Figure 5C:
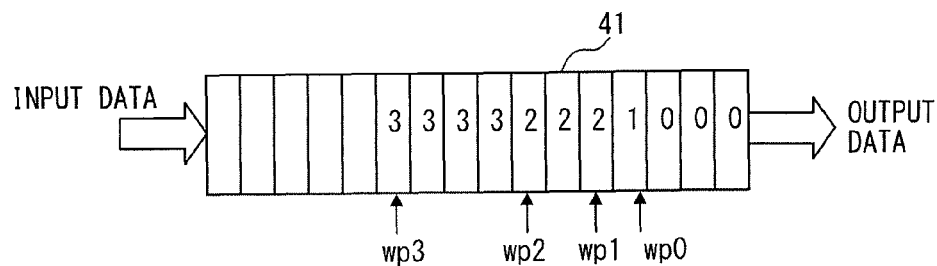

FIG. 5A to FIG. 5C are diagrams explaining the basic operation of the buffer circuit of the embodiment.

As illustrated in FIG. 5A, the buffer circuit of the embodiment is a buffer circuit having the size corresponding to the total amount of transfer data and has a register array and a control circuit of the register array. The control circuit performs control so as to store a plurality of pieces of received data in the register array after rearranging the data into the transfer order determined in advance, and to sequentially output the data as one piece of transfer data when all the plurality of pieces of data is stored.

The register array has registers in a plurality of stages and each register stores stored data of the register in the following stage in accordance with an output signal, stores data from the input bus in accordance with a write signal, and stores stored data of the register in the preceding stage in accordance with an already-stored data shift signal.

The control circuit stores each piece of received data in the order from the initial stage register in accordance with the tag number. The control circuit has a pointer register configured to store a rear end pointer corresponding to the tag number and indicating the position of a rear end register that stores each piece of received data. When newly storing new received data, the control circuit determines the position of a write register that stores the new received data from the rear end pointer corresponding to the tag number of the new received data. Due to this, within the buffer, the operation is performed so that arranged data is stored from the front position in a state where the data is crammed toward the front, and therefore, the capacity of the buffer may be the same as the total amount of transfer data.

Then, the control circuit outputs the write signal to the write register and outputs the already-stored data shift signal to the registers in the stages following the stage of this register, and when all the plurality of pieces of received data is stored, the control circuit outputs the output signal to all the registers. Because the buffer circuit of the embodiment has the configuration and the function such as this, it is possible to suppress latency in data transfer without interposition of selector control of data etc.

FIG. 5B illustrates a state where data with division numbers (=TAG) 0, 2, and 3 is stored from the front in a register array 41 formed by registers in 16 stages. Data with TAG0 is stored in the zeroth to second registers, data with TAG2 in the third to fifth registers, and data with TAG3 in the sixth to ninth registers. Rear end pointers wp0, wp2, and wp3 indicate the rear end position (rear end+1) of the stored data with TAG 0, 2 and 3 and wp1 indicates the position in which data with TAG1 is stored when the data with TAG1 is input. Consequently, wp0=3, wp1=3, wp2=6, and wp3=10.

In the state in FIG. 5B, if the data with TAG1 is transferred, the data with TAG1 is stored between the data with TAG0 and the data with TAG2, i.e. in the third register indicated by wp1=3.

As illustrated in FIG. 5C, in the case where the length of the data with TAG1 is 1, the data with TAG1 is stored in the third register indicated by wp1=3, and wp2 and wp3 are incremented by 1 (shifted backward), however, wp0=3 does not change.

If the length of the data with TAG1 is 2 or more, the above-mentioned operation is repeated the number of times corresponding to the length. Consequently, if the length of the data with TAG1 is 5, at the point of time when storing of the data with TAG1 is completed, wp0=3, wp1=8, wp2=11, and wp3=15 will be the results.

In the case where stored data is output from the register array 41 after all the transfer data is stored in the register array 41, the data in each register is shifted by one stage in the direction toward the initial stage while reducing the values of the rear end pointers wp0, wp1, wp2, and, wp3 by 1 (while subtracting 1).

The rear end pointers woo, wp1, wp2, and wp3 all indicate the register in the initial stage at the time of reset and in the case where the position indicated by the rear end pointer (with a smaller number) nearer to the front side (initial stage side) moves backward, the rear end pointers following the rear end pointer shift backward by the same number.

Next, a specific configuration example of the buffer circuit of the embodiment is explained.

Figure 6:
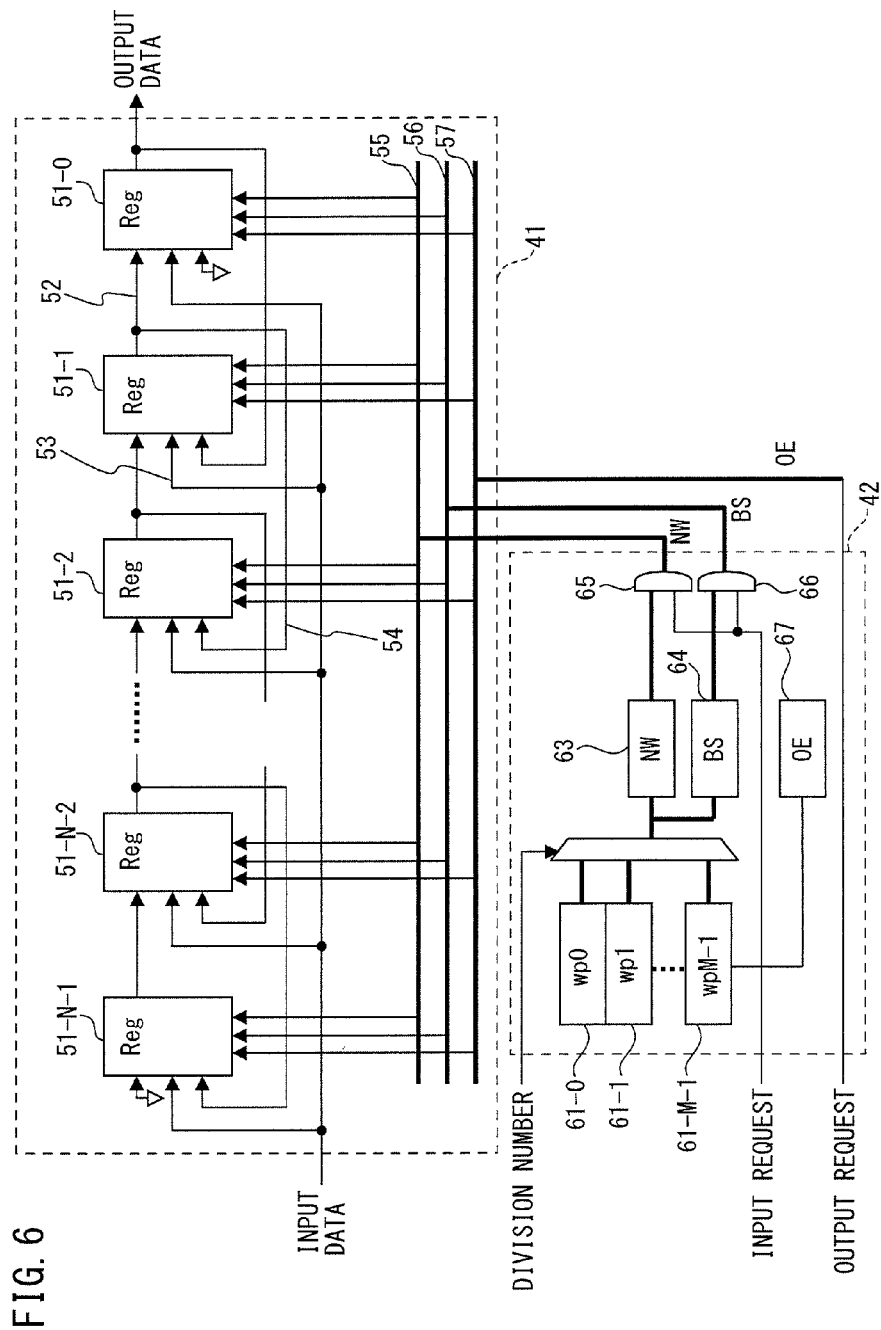
FIG. 6 is a diagram illustrating a configuration of the buffer circuit of the embodiment.

FIG. 6 is a diagram illustrating a configuration of the buffer circuit of the embodiment.

The buffer circuit of the embodiment has the register array 41 and a control circuit 42.

The register array 41 has N registers (Reg) 51-0, 51-1, ..., 51-N-2, 51-N-1, a data path 52 from the register in the stage to the register in the preceding stage, an input data bus 53 connected in common to all the registers, and a data path 54 from the register in the stage to the stage in following the stage. The register array 41 further has a new data write signal path 55 to give instructions to write input data to each register, a backward shift signal path 56 to give instructions to shift the already-stored data backward, and an output signal path 57.

It is possible for each register to store data with a data bus width. For example, in the case where the data bus width is 64 bits (8 bytes) and the total amount of transfer data is 128 bytes, each register holds data of 64 bits (8 bytes) and the register array is formed by the registers 51-0 to 51-15 in 16 stages.

The control circuit 42 has pointer registers 61-0, 61-1, ..., 61-M-1, a position determination circuit 62, a new data write pulse (NW) generation circuit 63, a backward shift pulse (BS) generation circuit 64, two AND gates 65 and 66, and an output pulse (OE) generation circuit 67.

The pointer registers 61-0, 61-1, ..., 61-M-1 store the rear end pointers wp0, wp1, ..., wpM-1 of each piece of data explained in FIG. 5.

The position determination circuit 62 searches for the number of a pointer register that agrees with the TAG number of new data requested to be input and outputs the value of the rear end pointer corresponding thereto and the length of the new data to the new data write pulse (NW) generation circuit 63 and the backward shift pulse (BS) generation circuit 64.

The new data write pulse (NW) generation circuit 63 outputs a new data write signal NW to give instructions to write input data to the register indicated by the value of the rear end pointer output from the position determination circuit 62. At this time, the new data write pulse (NW) generation circuit 63 never outputs the new data write pulse NW to the other registers.

The backward shift pulse (BS) generation circuit 64 outputs a backward shift pulse BS to give instructions to shift the already-stored data backward to the registers indicated by all the values equal to or more than the value of the rear end pointer output from the position determination circuit 62 to which 1 is added.

The new data write pulse (NW) generation circuit 63 and the backward shift pulse (BS) generation circuit 64 repeat the above operation the number of times indicated by the length of the new data while incrementing the value of the rear pointer one by one.

The two AND gates 65 and 66 perform control so that the new data write pulse NW and the backward shift pulse BS are output to the register array 41 only when the input request is made to the buffer circuit.

The output pulse (OE) generation circuit 67 outputs an output pulse OE to all the registers of the register array 41 in response to the output request made to the buffer circuit. The output pulse (OE) generation circuit 67 outputs the output pulse OE the number of times corresponding to the position of the final stage of the transfer data held in the pointer register, i.e. the length of the transfer data.

Consequently, the output pulse OE is output in common to all the registers of the register array 41. The new data write pulse NW and the backward shift pulse BS, i.e. NW0 to NW-N-1 and BS0 to BS-N-1, are supplied to all the registers of the register array 41. However, BS0 is never generated. Further, only one of the output pulse OE, the new data write pulse NW, and the backward shift pulse BS is output to the same register at the same time.

Figure 7:
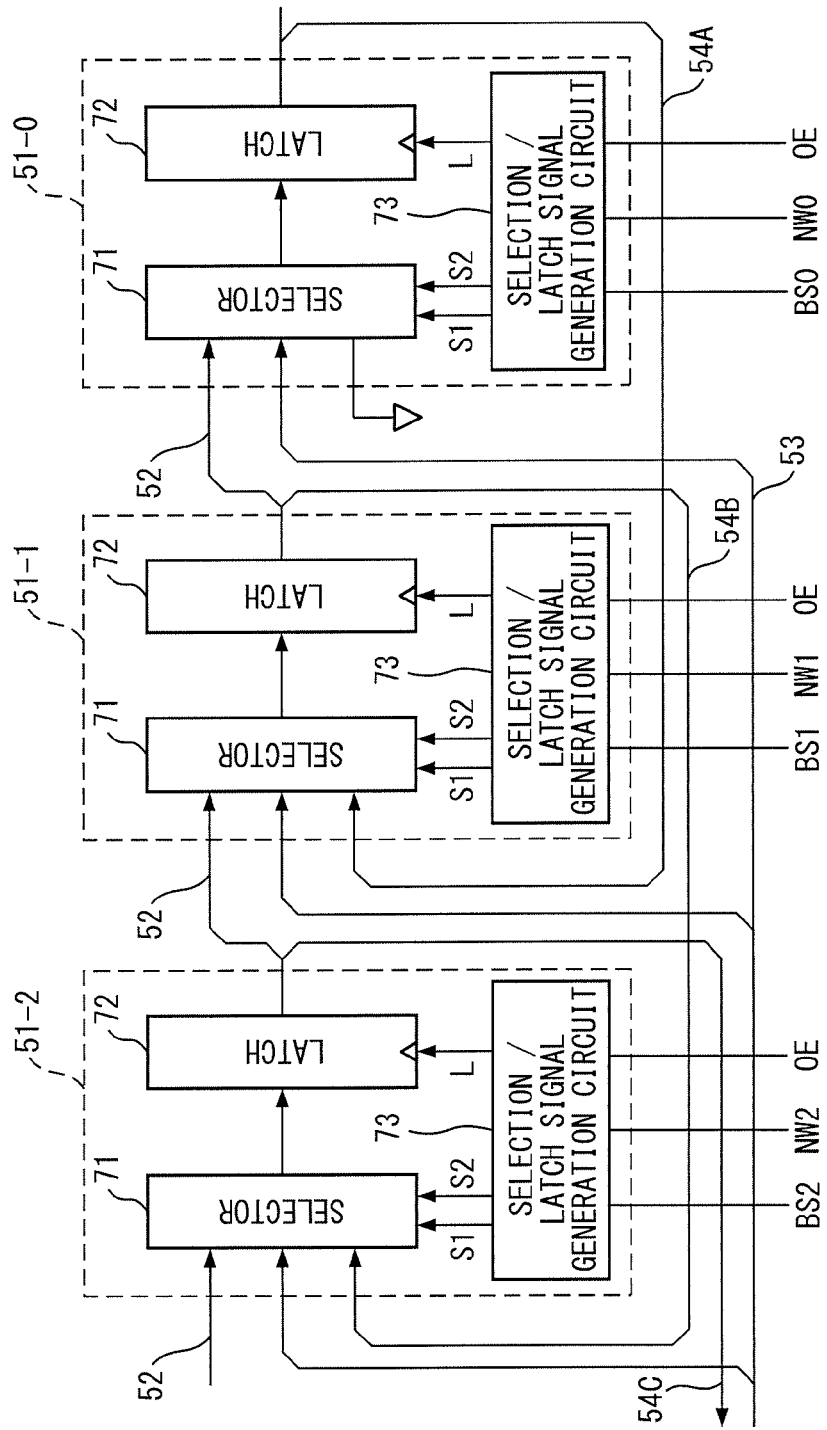
FIG. 7 is a diagram illustrating a circuit example of each register.

FIG. 7 is a diagram illustrating a circuit example of each register and here, only the three registers, i.e. 51-0, 51-1, and 51-2 are illustrated.

Each register has a selector 71, a latch 72, and a selection/latch signal generation circuit 73. The selector 71 selects one of the data of the data path 52 from the register in the stage to the register in the preceding stage, the data of the input data bus 53, and the data of data paths 54A, 54B, and 54C from the register in the stage to the register in the following stage and outputs the data to the latch 72. As illustrated in FIG. 7, in the register 51-0 in the initial stage, the input of the data path 54 from the register in the stage to the register in the following stage is fixed to zero. Similarly, as illustrated in FIG. 6, in the register 51-15 in the final stage, the input of the data path 52 from the register in the stage to the register in the preceding stage is fixed to zero. Here, explanation is given on the assumption that there is a case where the output of each selector 71 enters a high impedance state without selecting any data.

The latch 72 latches the output of the selector 71 in accordance with a latch signal L and holds the data until the next data is latched.

The selection/latch signal generation circuit 73 generates the selection signals S1 and S2 and the latch signal L in accordance with the new data write signal NW, the backward shift signal BS, and the output signal OE.

Figures 8A, 8B:
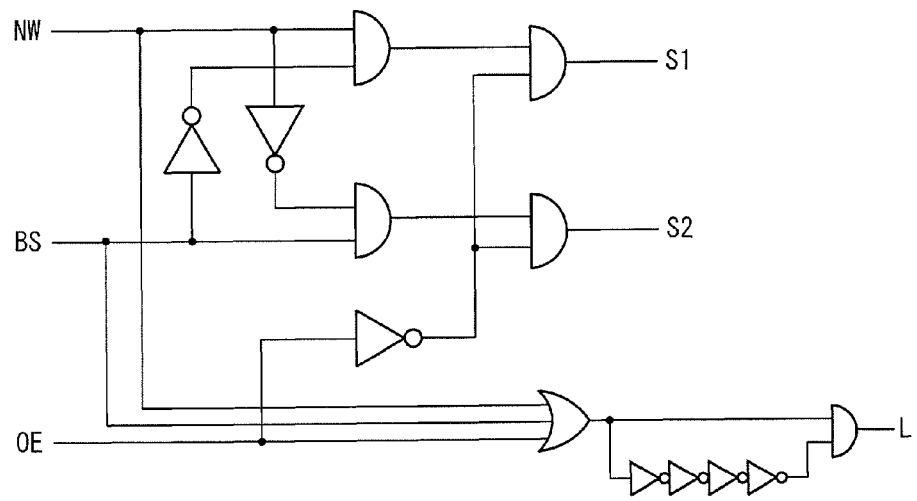
FIG. 8A is a diagram illustrating a circuit example of the selection/latch signal generation circuit.
FIG. 8B is a diagram illustrating a truth table of the operation of the circuit in FIG. 8A.

FIG. 8A is a diagram illustrating a circuit example of the selection/latch signal generation circuit 73. FIG. 8B is a diagram illustrating a truth table of the operation of the circuit in FIG. 8A.

As illustrated in FIG. 8A, when the output signal OE=1 (=H: active), S1=0 and S2=0, and the selector selects the data of the path 52, i.e. the data output from the register in the following stage. When the output signal OE=0 (=L: inactive) and NW=1, S1=0 and S2=1, and the selector selects the data of the input data bus 53, i.e. the data newly transferred. When the output signal OE=0 and BS=1, S1=1 and S2=0, and the selector selects the data of the data paths 54A, 54B, and 54C from the register in the stage to the register in the following stage.

When the output signal OE and one of the new data write pulse NW and the backward shift pulse BS are output, the latch signal L is generated.

Each register stores the stored data of the register in the following stage in accordance with the output signal OE, stores the data from the input bus in accordance with the new data write pulse (write signal) NW, and stores the stored data of the register in the preceding stage in accordance with the backward shift pulse (already-stored data shift signal) BS.

Next, a specific operation example of the buffer circuit of the embodiment is explained.

FIG. 9A to FIG. 11C are diagrams explaining the operation to store divided data transferred from the peripheral device in the register array 41 in the order of the TAG number and the operation to output the data in order after all the transfer data is stored. Here, the case is illustrated where the total amount of transfer data of 32 bits (4 bytes) with a width of 8 bits (1 byte) is stored in the register array of four stages as four-time-divided data each having 8 bits (1 byte) and then output, and in this case, the data is transferred in the order of the TAG number 2, 0, 3, 1. In order to make explanation simple, explanation is given and schematically illustrated on the assumption that the length of each piece of divided data is 1 as described above, however, the length may be 2 or longer.

FIG. 12 is a time chart corresponding to FIG. 9A to FIG. 11C and because of limitation on schematic drawings, explanation is given on the assumption that divided data arrives successively and is output immediately after all the transfer data is stored. However, this is not limited and in actuality, it is general that divided data arrives with an interval in between and is output after all the transfer data is stored and the output from the local bus is permitted. Further, the operation speed when storing transfer data from the peripheral device may differ from the operation speed when outputting the transfer data to the local bus.

Figure 9A:
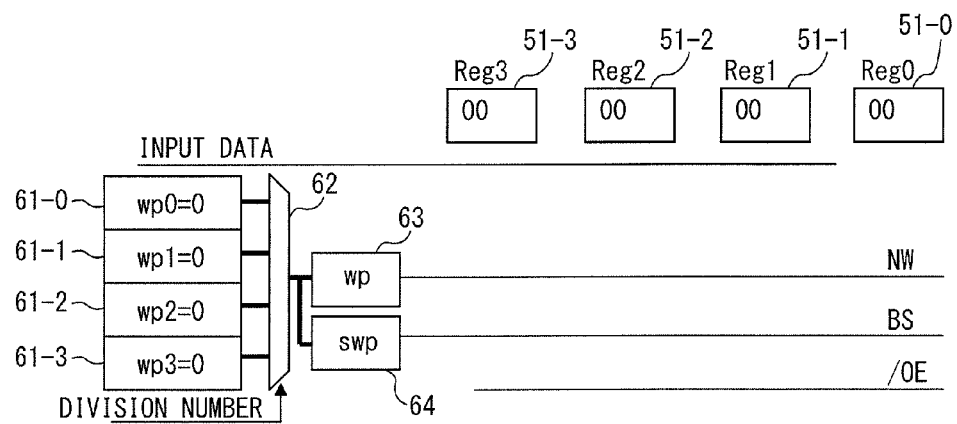
FIGS. 9A to 11C are diagrams explaining the operation to store divided data transferred from the peripheral device in the register array in the order of the TAG number and the operation to output the data in order after all the transfer data is stored.

FIG. 9A illustrates an initialized state where the output of the stored data from the buffer circuit is completed and "00" (arbitrary value) is stored in all the registers (latch). At this time, the rear end registers are all zero, i.e. wp0=wp1=wp2=wp3=0. In the time chart in FIG. 12, this is the state illustrated at the left end, and the latches of the four registers all hold "00".

Figure 9B:
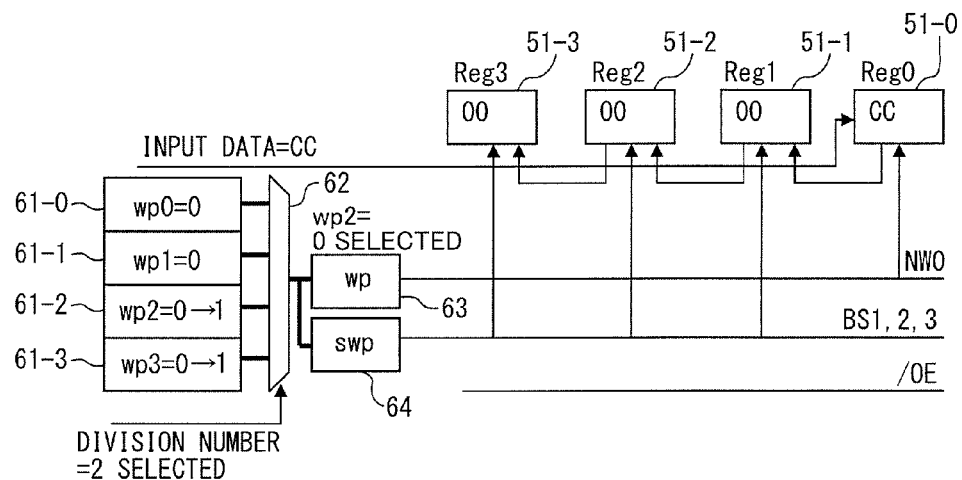

FIG. 9B illustrates the case where data "CC" with TAG=2 is input next. Because TAG-2, wp2 is selected and its value is 0, and therefore, NW0 is output and the input data CC is stored in the register (Reg0) 51-0. Then, BS1, BS2, and BS3 are output and the registers (Reg1, 2, 3) 51-1, 51-2, and 51-3 with numbers larger than the value 0 of wp2 store the data of the register in the preceding stage, i.e. Reg1=Reg0, Reg2=Reg1, and Reg3=Reg2 are established. In other words, the data is shifted backward and then stored. Further, the rear end registers wp2 and wp3 with the TAG numbers equal to or more than TAG=2 are incremented by 1.

In FIG. 12, the new data CC is input, NW0 and BS1, BS2, and BS3 are output, the register (Reg0) 51-0 latches CC, and the registers (Reg1, 2, 3) 51-1, 51-2, and 51-3 latch the data of the register in the preceding stage.

Figure 10A:
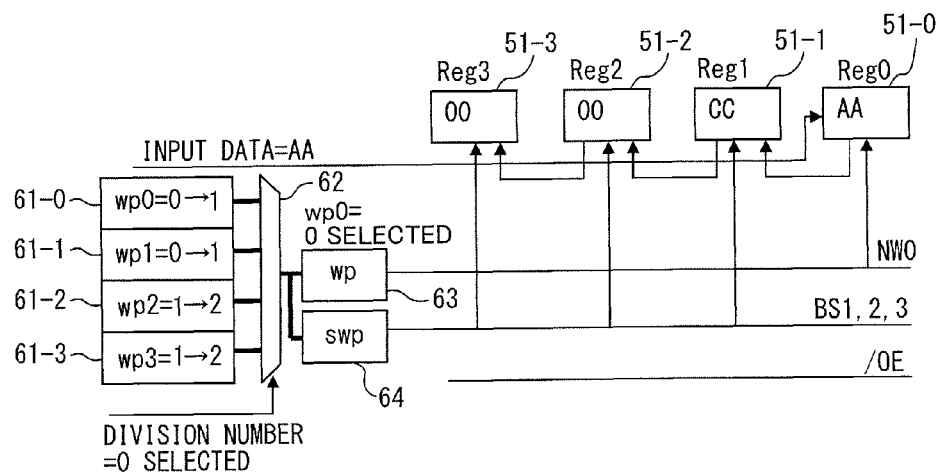

FIG. 10A illustrates the case where data "AA" with TAG=0 is input. Because TAG=0, wp0 is selected and its value is 0, and therefore, NW0 is output and the input data AA is stored in the register (Reg0) 51-0. Then, BS1, BS2, and BS3 are output and the registers (Reg1, 2, 3) with the numbers larger than the value 0 of wp0 store data of the register in the preceding stage, i.e. Reg1=Reg0, Reg2=Reg1, and Reg3=Reg2 are established. In other words, the data is shifted backward and stored. Further, the rear end registers wp0, wp1, wp2, and wp3 with the TAG numbers equal to or more than TAG=0 are incremented by 1. Due to this, wp0=1, wp1=1, wp2=2, and wp3=2 will be the results.

In FIG. 12, the new data AA is input, NW0 and BS1, BS2, and BS3 are output, the register (Reg0) 51-0 latches AA, and the registers (Reg1, 2, 3) 51-1, 51-2, and 51-3 latch the data Reg0=CC, Reg1=0, and Reg2=0, respectively, of the register in the preceding stage.

Figure 10B:
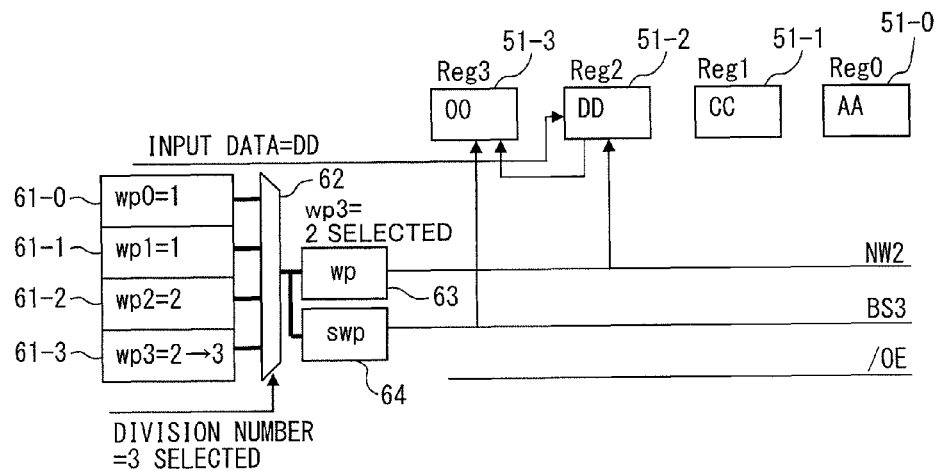

FIG. 10B illustrates the case where data "DD" with TAG=3 is input. Because TAG=3, wp3 is selected and its value is 2, and therefore, NW2 is output and the input data DD is stored in the register (Reg2) 51-2. Then, BS3 is output and the register (Reg1) 51-3 with the number larger than the value 2 of wp2 stores the data of the register in the preceding stage, i.e. Reg3=Reg2 is established. The rear end register wp3 with the TAG number equal to or more than TAG=3 is incremented by 1. Due to this, wp0=1, wp1=1, wp2=2, and wp3=3 will be the results.

In FIG. 12, the new data DD is input, NW2 and BS3 are output, the register (Reg2) 51-2 latches DD, and the register (Reg3) 51-3 latches the data Reg2=0 of the register in the preceding stage.

Figure 11A:
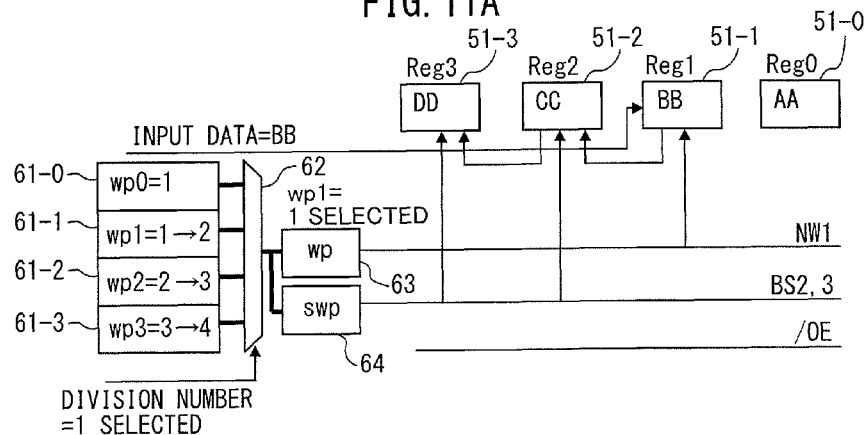

FIG. 11A illustrates the case where data "BB" with TAG=1 is input. Because TAG=1, wp1 is selected and its value is 1, and therefore, NW1 is output and the input data BB is stored in the register (Reg1) 51-1. Then, BS2 and BS3 are output and the registers (Reg2, 3) 51-2 and 51-3 with the numbers larger than the value 1 of wp1 store the data of the register in the preceding stage, i.e. Reg2=Reg1 and Reg3=Reg2 are established. The rear end registers wp1, wp2, and wp3 with the TAG numbers equal to or more than TAG=1 are incremented by 1. Due to this, wp0=1, wp1=2, wp2=3, and wp3=4 will be the results.

In FIG. 12, the new data BB is input, NW1, BS2, and BS3 are output, the register (Reg1) 51-1 latches BB, and the registers (Reg2, 3) 51-2 and 51-3 latch the data Reg1=CC and Reg2=DD, respectively, of the register in the preceding stage.

In the manner as described above, all the transfer data from the peripheral device is stored, and therefore, the output operation from the register circuit is performed next.

Figure 11B:
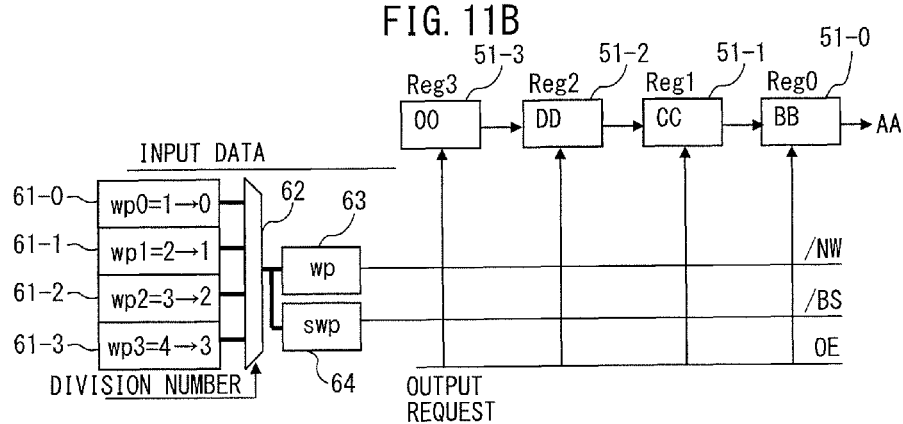

FIG. 11B illustrates the case where an output request is made. In response to the output request, the output signal OE is output to all the registers 51-0, 51-1, 51-2, and 51-3 and each register stores the data in the following stage. Due to this, the held data is shifted from the register to the preceding register and the data AA is output from the register (Reg0) 51-0 in the initial stage. That is, Reg0=Reg1, Reg1=Reg2, Reg2=Reg3, and Reg3=00 (arbitrary value) are established. Then, the rear end pointers wp0, wp1, wp2, and wp3 are decremented by 1. The lower limit of the pointer is 0.

In FIG. 12, the output signal OE is output and Reg0=Reg1=BB, Reg1=Reg2=CC, Reg2=Reg3=DD, and Reg3=00 (arbitrary value) are established.

Figure 11C:
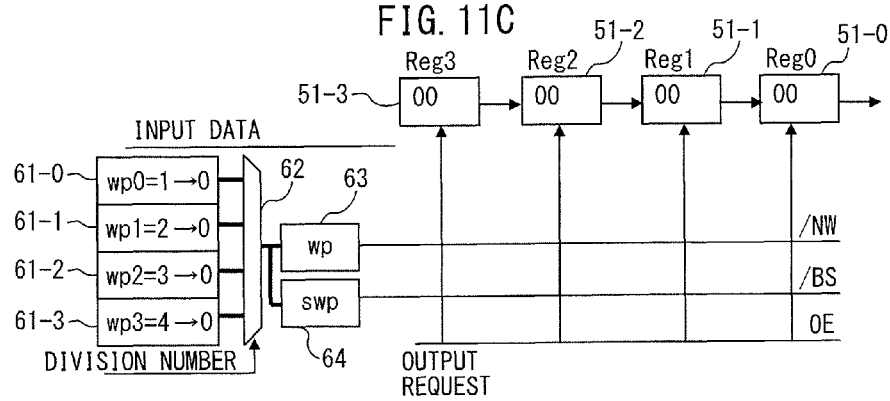

After this, by performing the operation in FIG. 11B three more times, DD is output from the register (Reg0) 51-0 in the initial stage and the output of all the transfer data is completed. Then, as illustrated in FIG. 11C, in all the registers, the held data is shifted from the register to the preceding register and Reg0=Reg1=00, Reg1=Reg2=00, Reg2=Reg3=00, and Reg3=00 (arbitrary value) are established. Then, by decrementing the rear end pointers wp0, wp1, wp2, and wp3 by 1, all the rear end pointers become 0 because the lower limit of the pointer is 0. In the manner described above, the initial state is brought about.

As above, the data is output from the register circuit in the order from the register in the initial stage, and therefore, a data selection circuit and a combinational circuit are not interposed in a path of output data and the latency is low.

In the explanation in FIG. 8A to FIG. 12, the length of each piece of divided data is assumed to be 1, however, the length may be 2 or more and in such a case, the operation to store each piece of divided data in the buffer circuit is repeated the number of times corresponding to the length.

According to the embodiment, a buffer circuit small in size and with low latency is provided.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A buffer circuit comprising:
a register array including a plurality of registers in a plurality of stages; and
a control circuit configured to rearrange a plurality of pieces of received data in a determined transfer order and to store the rearranged received data in the register array, the control circuit configured to control the register array so that the register array sequentially outputs the plurality of pieces of received data as one piece of transfer data when all the received data is stored, wherein
the control circuit controls the register array so that the register array stores a piece of data stored in each register in a register in a preceding stage when the register array outputs the plurality of pieces of received data, and
the control circuit determines a write register among the plurality of registers in accordance with the transfer order when the register array newly stores a new piece of the received data and controls the register array so that the register array stores a piece of data stored in the write register in a register in a following stage of the write register and stores the new piece of received data in the write register.

2. The buffer circuit according to claim 1, wherein
each register of the register array is configured to internally store a piece of data stored in a register in a following stage in accordance with an output signal, to internally store a piece of data from an input bus in accordance with a write signal, and to internally store a piece of data stored in a register in a preceding stage in accordance with an already-stored data shift signal, and the control circuit:
- is configured to control the register array so that the register array stores respective pieces of received data in order from a register in an initial stage of the register array in accordance with tag numbers attached to the respective pieces of the received data;
- includes pointer registers configured to store rear end pointers corresponding to the tag numbers, each of the rear end pointers indicating a rear end position of registers that store pieces of the received data with the corresponding tag number;
- determines a position of the write register in which the new piece of the received data is stored on the basis of the rear end pointer corresponding to the tag number attached to the new pieces of the received data when the new piece of the received data is newly stored, outputs the write signal to the write register, and outputs the already-stored data shift signal to registers in following stages of the write register; and
- outputs the output signal to all of the registers of the register array when all of the plurality of pieces of received data are stored.

3. The buffer circuit according to claim 2, wherein each register of the register array includes:
- a selector configured to select one of the piece of data stored in the register in the following stage, the piece of data stored in the register in the preceding stage, and the piece of data from the input bus; and
- a latch circuit configured to latch an output of the selector.

4. The buffer circuit according to claim 3, wherein
the selector of the register in the initial stage is controlled so as not to select the piece of data stored in the register in the preceding stage, and
the selector of a register in an final stage receives an initial value as the piece of data stored in the register in the following stage.

5. The buffer circuit according to claim 1, wherein
storing of the new piece of the received data in the write register and storing of pieces of data stored in preceding stages in the registers in the following stages of the write register are performed in parallel at the same time when the register array newly stores a new piece of the received data.

6. A semiconductor integrated circuit comprising:
a local bus; and
an interface circuit configured to interface with a peripheral device and connected to the local bus, wherein
the interface circuit includes a buffer circuit,
the buffer circuit including:
a register array including a plurality of registers in a plurality of stages; and
a control circuit configured to rearrange a plurality of pieces of received data in a determined transfer order and to store the rearranged received data in the register array, the control circuit configured to control the register array so that the register array sequentially outputs the plurality of pieces of received data as one piece of transfer data when all the received data is stored, wherein
the control circuit controls the register array so that the register array stores a piece of data stored in each register in a register in a preceding stage when the register array outputs the plurality of pieces of received data, and the control circuit determines a write register among the plurality of registers in accordance with the transfer order when the register array newly stores a new piece of the received data and controls the register array so that the register array stores a piece of data stored in the write register in a register in a following stage of the write register and stores the new piece of received data in the write register.

7. The semiconductor integrated circuit according to claim 6, wherein
each register of the register array is configured to internally store a piece of data stored in a register in a following stage in accordance with an output signal, to internally store a piece of data from an input bus in accordance with a write signal, and to internally store a piece of data stored in a register in a preceding stage in accordance with an already-stored data shift signal, and the control circuit:
- is configured to control the register array so that the register array stores respective pieces of received data in order from a register in an initial stage of the register array in accordance with tag numbers attached to the respective pieces of the received data;
- includes pointer registers configured to store rear end pointers corresponding to the tag numbers, each of the rear end pointers indicating a rear end position of registers that store pieces of the received data with the corresponding tag number;
- determines a position of the write register in which the new piece of the received data is stored on the basis of the rear end pointer corresponding to the tag number attached to the new pieces of the received data when the new piece of the received data is newly stored, outputs the write signal to the write register, and outputs the already-stored data shift signal to registers in following stages of the write register; and
- outputs the output signal to all of the registers of the register array when all of the plurality of pieces of received data are stored.

8. The semiconductor integrated circuit according to claim 7, wherein
each register of the register array includes:
- a selector configured to select one of the piece of data stored in the register in the following stage, the piece of data stored in the register in the preceding stage, and the piece of data from the input bus; and
- a latch circuit configured to latch an output of the selector.

9. The semiconductor integrated circuit according to claim 8, wherein
the selector of the register in the initial stage is controlled so as not to select the piece of data stored in the register in the preceding stage, and
the selector of a register in an final stage receives an initial value as the piece of data stored in the register in the following stage.

10. The semiconductor integrated circuit according to claim 6, wherein
storing of the new piece of the received data in the write register and storing of pieces of data stored in preceding stages in the registers in the following stages of the write register are performed in parallel at the same time when the register array newly stores a new piece of the received data.

* * * * *